A. D. Brown, Sr.
Wheel.

No. 111,312.   Patented Jan. 31, 1871.

Witnesses:
T. E. Brecht
John F. Fennell

Inventor.
Alexander D. Brown, Sr.
By N. Crawford
atty.

UNITED STATES PATENT OFFICE.

ALEXANDER D. BROWN, SR., OF COLUMBUS, GEORGIA.

IMPROVEMENT IN WHEELS FOR VEHICLES.

Specification forming part of Letters Patent No. 111,312, dated January 31, 1871.

*To all whom it may concern:*

Be it known that I, ALEXANDER D. BROWN, Sr., of Columbus, in the county of Muscogee, in the State of Georgia, have made certain Improvements in Wheels for Wheelbarrows and other Vehicles, of which the following is a specification.

The object of the invention is to furnish a light, strong, durable, and cheap wheel for wheelbarrows and other vehicles; and it consists in the construction of the wheel as an article of manufacture, and in the construction of the parts of the wheel.

Figure 1:
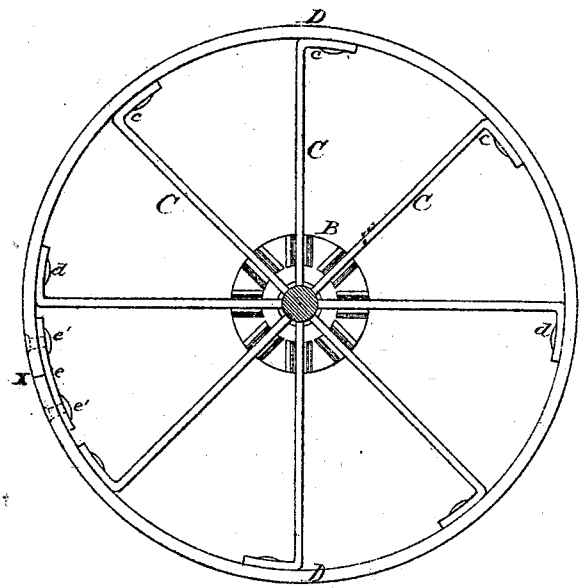
Figure 2:
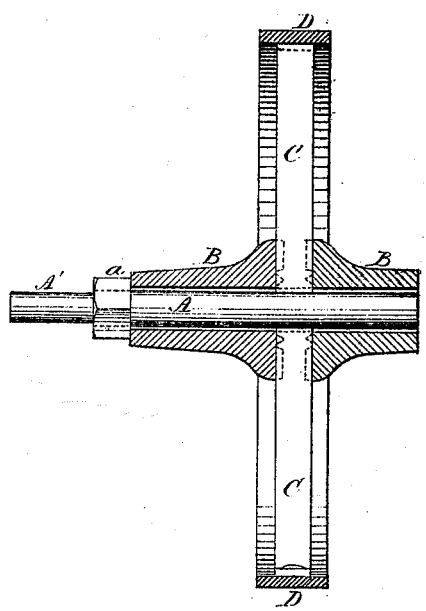
Figure 3:
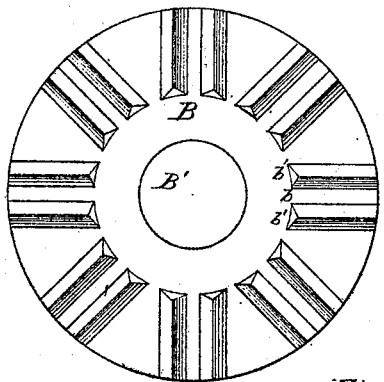
Figure 4:
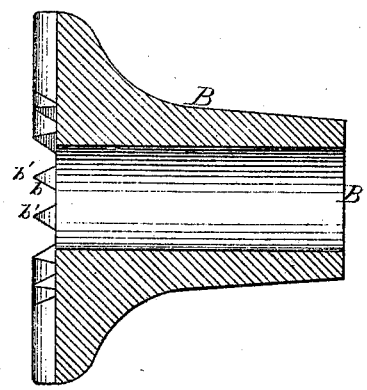
Figure 5:
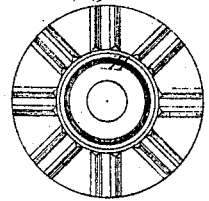

In the drawings, Figure 1 is an upright sectional side view of the wheel. Fig. 2 is a transverse view of the same. Fig. 3 is a view of the inner end of the divided hub. Fig. 4 is a longitudinal view of same; and Fig. 5 is a modification of Fig. 3.

A represents the metal axle, having the journal-bearing A' at either end.

B B is a metal hub divided or in two equal parts in its length, constructed to have the longitudinal aperture B' centrally through its length to receive the axle A, and has projections $b'$ $b'$ projecting from the faces of the inner ends of the two parts. These projections are in pairs, and have the space $b$ between them, and are consequently parallel with each other and far enough apart to receive the radial arm or spoke, and are broad at their bases, tapering to or nearly to an edge at their extreme point of projection.

C C are the radial arms or spokes of the wheel, any desired number of which may be used. These arms or spokes are preferably made of bar-iron of the proper width and thickness to give the necessary strength to support the wheel and its load, fitted to bear upon the axle at their inner ends, and bent at $c$ to conform to the proper circle and inside diameter of the tire.

D is the tire, made of flat bar metal, (iron preferably,) of the proper width and thickness, bent to a perfect circle, and of the circumference to exactly fit in its inside upon the bent parts $c$ of the arms or spokes, and to which it is securely fastened by bolts or rivets $d$ $d$. The tire may be welded, as tires usually are, to form it in a whole circle, or its ends may be abutted together, as seen at $x$ in Fig. 1, and held in that position rigidly by having the support-piece $e$ riveted or bolted by rivets or bolts $e$ $e'$ to the tire D. The shape of the projections $b'$ on the inner ends of the divided hub are so formed as that iron of different thicknesses can be used for the arms or spokes, and any desired width of arm may be used, as the two parts of the divided hub can be adjusted to receive any width of arm necessary, as the axle A has a screw-thread cut just inside of the journal-bearings at each end, and a nut, $a$, having a screw-thread to fit thereon, is turned upon the axle and against the outer ends of the two parts of the hub B, so as to clamp the radial arms C between the two parts of the hub and between the projections $b'$ $b'$, holding the arms in rigid and proper position to receive the tire, which, when bolted or riveted to the bent parts $c$ of the arms C, make a wheel that is strong, light, and durable, not liable to get out of shape by use, and if by any accident it becomes out of shape is easily put in shape again.

If the wheel is used for other purposes than for wheelbarrows, and instead of having the radial arms C abut against the shaft A, an annular projection, E, Fig. 5, is made on the face of each part of the hub B, and by notching the radial arms C to fit onto the projection E near their inner ends and on each side thereof, when the nuts $a$ are turned hard against the divided hub B, the arms will be clamped between the radial projections $b'$ $b'$ and upon the annular projections E, and be securely held in position, as the projection E will prevent the radial arms from being forced inward or from being drawn out of the hub, as seen in dotted lines in Fig. 2. By this construction of hub the hub can be bored out to receive the arm of an axle, and the wheel can revolve upon such axle-arm.

The wheel can be quickly taken from the axle or as quickly attached, there being but the two screw-nuts to turn on or off to effect the purpose.

Having thus described my invention, what I claim, and desire to secure by Letters Patent, is—

1. The angular projections $b'$ $b'$ on the inner ends of the two parts of hub B, when constructed in the manner and for the purpose described.

2. The radial arms C, in combination with the two parts of the hub B, and axle A, having the screw-nuts a, when the parts are constructed in the manner and for the purpose described.

3. The divided hub B, having annular projection E and radial projectious b' b', in combination with the radial arms or spokes C, when constructed to operate in the manner shown.

4. The wheel herein described, as a new article of manufacture.

ALEXANDER D. BROWN, SR.

Witnesses:
    A. B. ROSTICK,
    D. H. BURTS,
    JAMES M. BIVINS.